United States Patent [19]

Kimura

[11] Patent Number: 4,701,625

[45] Date of Patent: Oct. 20, 1987

[54] SEPARATION TYPE DETECTOR WITH ADDRESSED SELECTION

[75] Inventor: Tetsuo Kimura, Tokyo, Japan

[73] Assignee: Nittan Company, Limited, Tokyo, Japan

[21] Appl. No.: 881,606

[22] Filed: Jul. 3, 1986

[30] Foreign Application Priority Data

Sep. 2, 1985 [JP] Japan ................................ 60-192077

[51] Int. Cl.[4] ............................................ G01N 15/06

[52] U.S. Cl. .................................... 250/573; 340/505

[58] Field of Search ..................... 250/221, 222.1, 573, 250/574, 575; 340/504, 505, 516, 534, 555, 556, 557, 630

[56] References Cited

U.S. PATENT DOCUMENTS 4,375,637 3/1983 Desjardins .......................... 340/505

4,525,700 6/1985 Kimura et al. ...................... 340/505

4,636,649 1/1987 Kimura et al. ...................... 250/574

*Primary Examiner*—David C. Nelms

*Attorney, Agent, or Firm*—Hill, Van Santen, Steadman & Simpson

[57] ABSTRACT

A separation type detector includes at least one pair of transmission and reception units connected through a transmission line, detects environmental abnormality according to changes in pulse beams or ultrasonic waves transmitted from the transmission unit and received by the reception unit, and sends an abnormal signal to a central monitor through the transmission line. The transmission and reception units respectively include transmission circuits assigned with an identical address. The pair of transmission and reception units are synchronously operated in response to a command from a central monitor.

13 Claims, 3 Drawing Figures

SEPARATION TYPE DETECTOR WITH ADDRESSED SELECTION

BACKGROUND OF THE INVENTION

The present invention relates to a separation type detector which is used in a separation type extinction optical smoke detector in a fire alarm system or a burglar alarm system utilizing an ultrasonic wave, and which includes a transmission unit such as a light source or a sound wave source, and a reception unit separated from the transmission unit.

Conventional extinction smoke detectors in fire alarm systems include a separation type detector. The separation type detector has light-emitting and light-receiving units separated from each other by a distance of 10 m or more. Japanese Utility Model Diclosure No. 57-124758, incorporated herein, describes a "Separation Type Extinction Smoke Detector". Other conventional fire alarm systems have also been proposed. For example, in one system, a transmission circuit is arranged in each fire detector, and a receiver discriminates which detector is operated. In another system, a detected analog signal is sent back to a receiver. A typical example is described in Japanese Patent Disclosure No. 59-91597, incorporated herein, entitled an "Abnormality Alarm System".

In order to improve a S/N (signal-to-noise) ratio and save power in a conventional separation type extinction optical smoke detector, light beams are emitted as pulse beams to synchronize the light-emitting unit with the light-receiving unit. For this reason, a sync signal line is required between the light-emitting and light-receiving units. Since the length of the signal line is several tens of meters, electrical noise reduction must be taken into consideration.

SUMMARY OF THE INVENTION

It is an object of the present invention to provide a separation type detector for synchronizing a light-emitting unit with a light-receiving unit without using a sync signal line.

It is another object of the present invention to provide a separation type detector which has stable operation and which does not interfere with another separation type detector in a fire alarm system.

It is still another object of the present invention to provide an energy-saving separation type detector.

In order to achieve the above objects of the present invention, there is provided a separation type detector including a transmission unit and a reception unit connected thereto through a transmission line, the separation type detector being adapted to detect atmospheric abnormality according to changes in pulses transmitted from the transmission unit and received by the reception unit. It is also adapted to send an abnormality signal to a central monitor through the transmission line.

The transmission and reception units are a pair and are provided with transmission circuits assigned with an identical address. The pair of transmission and reception units are synchronously operated in response to a command from the central monitor.

According to the present invention, even if the sync signal line for connecting the transmission unit to the reception unit is not used, the transmission unit can be synchronized with the reception unit since their transmission circuits are assigned an identical address.

The above and other objects, features, and advantages of the present invention will be apparent from the following detailed description taken in conjunction with the accompanying drawings.

DESCRIPTION OF THE PREFERRED EMBODIMENTS

A separation type detector according to an embodiment of the present invention will be described with reference to the accompanying drawings.

Figure 1:
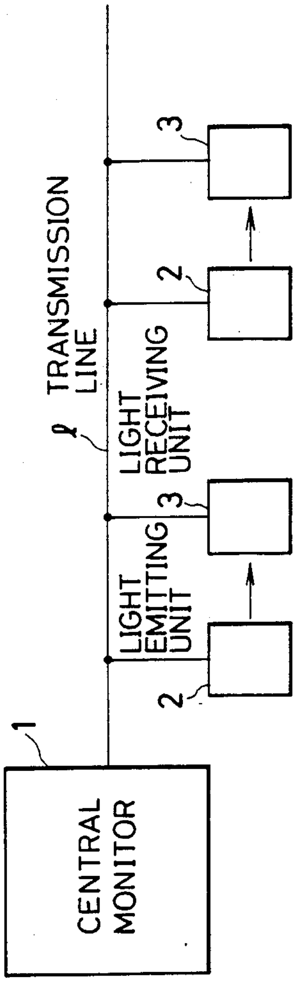
FIG. 1 is a block diagram of a fire alarm system using separation type extinction smoke detectors according to an embodiment of the present invention.

FIG. 1 is a block diagram of a fire alarm system using separation type extinction smoke detectors according to an embodiment of the present invention. The fire alarm system consists of a central monitor 1, a transmission line l extending from the central monitor 1, and pairs of light-emitting and light-receiving units 2 and 3 connected to the transmission line l. Each pair of light-emitting and light-receiving units 2 and 3 form a separation type extinction smoke detector. Other types of detectors may also be connected to the transmission line l. Transmission circuits are respectively arranged in the central monitor 1 and the light-receiving and light-emitting units 2 and 3. Each detector is assigned with a specific address, so that each pair of light-emitting and light-receiving units 2 and 3 is assigned with an identical address. The central monitor 1 cyclically accesses the detectors and determines, according to signals from the accessed detectors, if a fire is occurring. If a separation type extinction smoke detector assigned with a given address is accessed, the corresponding light-emitting and light-receiving units 2 and 3 are simultaneously accessed since they are assigned with the same address. The accessed light-emitting unit 2 emits a pulse beam of a predetermined duration. The light-receiving unit 3 receives the pulse beam from the light-emitting unit 2 and sends data based on the extinction change level of the pulse beam or data based on its discrimination to the central monitor 1. The light-emitting unit 2 does not perform transmission. In this manner, the pair of light-emitting and light-receiving units 2 and 3 are synchronized.

Figure 2:
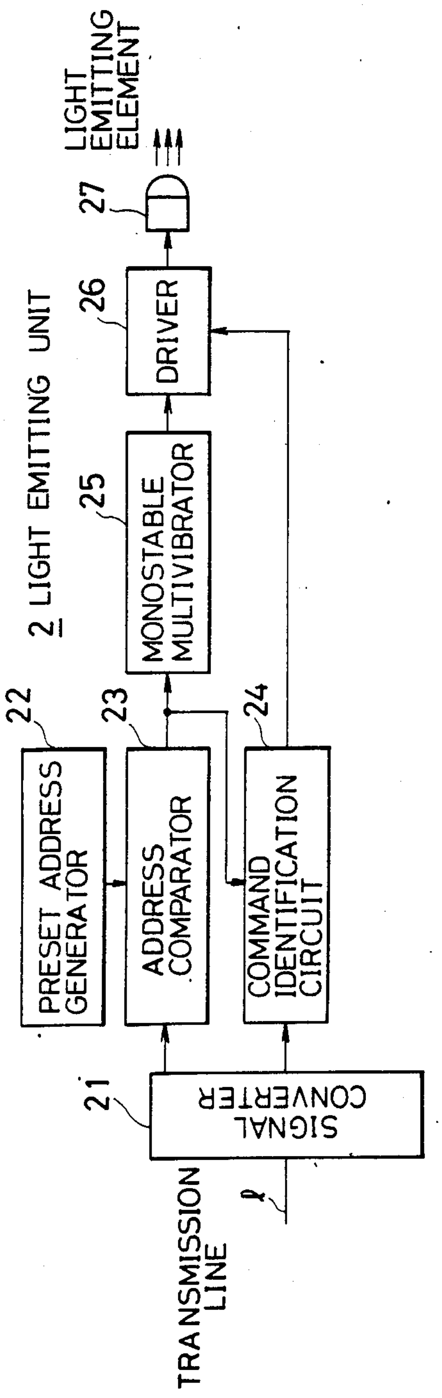
FIG. 2 is a block diagram of a light-emitting unit of the separation type extinction smoke detector of FIG. 1.

The light-emitting unit 2 of FIG. 1 will be described with reference to FIG. 2. FIG. 2 is a block diagram of the light-emitting unit 2. The unit 2 comprises a signal converter 21 connected to the transmission line l, a preset address generator 22, an address comparator 23, a command identification circuit 24, a monostable multivibrator 25, a driver 26, and a light-emitting element 27. The signal converter 21, the preset address generator 22, the address comparator 23, and the command identification circuit 24 constitute a transmission circuit. The signal converter 21 is formed by serial/parallel and parallel/serial converters. The signal converter 21 converts a serial access signal from the central monitor 1 to a parallel signal and supplies address and command signals to the address comparator 23 and the command identification circuit 24, respectively. When the address preset by a digital switch or the like in the preset address generator 22 coincides with the address signal from the signal converter 21, the address comparator 23 supplies a coincidence pulse to the monostable multivibrator 25 and the command identification circuit 24. The monostable multivibrator 25 is triggered in response to the coincidence pulse and supplies a pulse of a predetermined duration to the driver 26. The driver 26 is operated for a period of time in response to the output from the monostable multivibrator 25. The light-emitting element 27 is driven in response to the output from the driver 26 and emits a pulse beam. The driver 26 may modulate the input signal at a specific frequency to drive the light-emitting element 27, in order to increase an S/N ratio. The command identification circuit 24 analyzes a command signal from the signal converter 21 in accordance with the coincidence pulse. In normal operation, the command represents a response data request. The light-emitting units 2 without response data are kept disabled. In other words, the unaccessed light-emitting units 2 emit no light.

In order to perform a function test of the detector, a test command is output from the central monitor 1. The command identification circuit 24 supplies a test control signal to the driver 26. The driver 26 decreases the intensity level of the light-emitting element 27 in response to the test control signal. The function test is performed in the same way as the situation wherein the pulse beam to be incident on the light-receiving unit 3 is generated in the presence of smoke.

Figure 3:
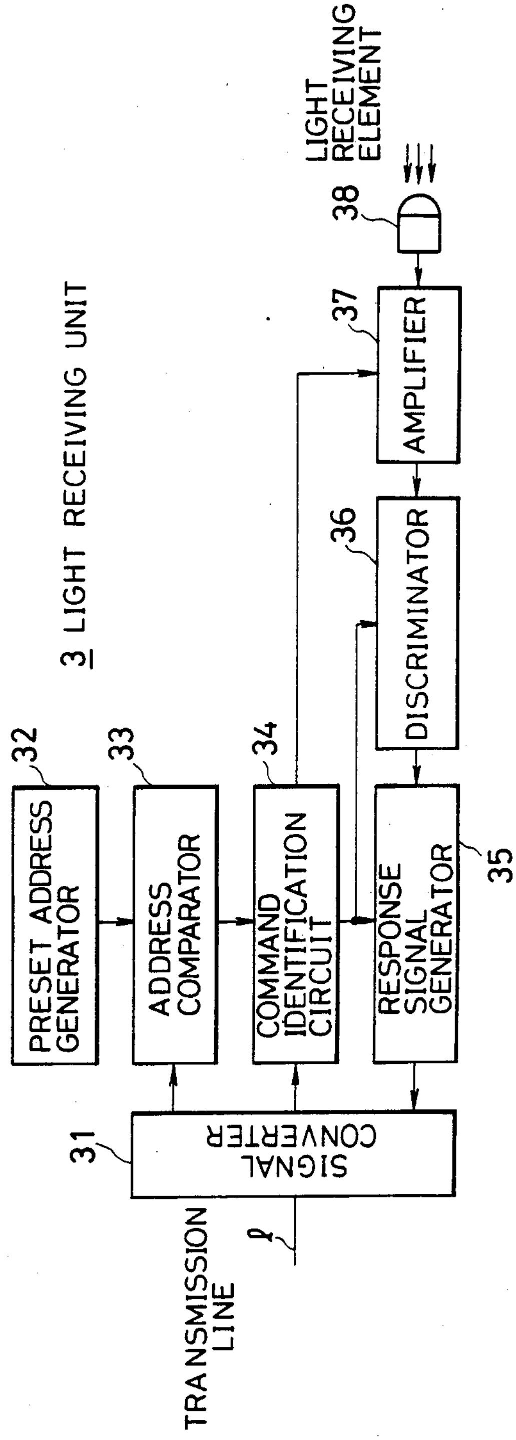
FIG. 3 is a block diagram of a light-receiving unit of the separation type extinction smoke detector of FIG. 1.

The light-receiving unit 3 of FIG. 1 will be described with reference to FIG. 3. FIG. 3 is a block diagram of the light-receiving unit 3. The unit 3 comprises a signal converter 31 connected to the transmission line l, a preset address generator 32, an address comparator 33, a command identification circuit 34, a response signal generator 35, a discriminator 36, an amplifier 37, and a light-receiving element 38. The signal converter 31, the preset address generator 32, the address comparator 33, the command identification circuit 34, and the response signal generator 35 form a transmission circuit. The signal converter 31 converts a serial access signal from the central monitor 1 to a parallel signal and supplies address and command signals to the address comparator 33 and the command identification circuit 34, respectively. When the address preset by a digital switch or the like in the preset address generator 32 coincides with the address signal from the signal converter 31, the address comparator 33 supplies a coincidence signal to the command identification circuit 34. The command identification circuit 34 analyzes the command signal from the signal converter 31 in response to the coincidence signal. In the normal monitoring mode, the command represents a response data request. The response data request signal is supplied to the response signal generator 35 and the discriminator 36. In this case, the response signal generator 35 and the discriminator 36 are rendered operative in synchronism with the light-emitting unit 2. The light-receiving element 38 receives the pulse beam from the light-emitting unit 2 and the amplifier 37 amplifies the light-receiving signal. An output signal from the amplifier 37 is then supplied to the discriminator 36. The discriminator 36 performs discrimination in accordance with the output signal from the amplifier 37, i.e., if a change in transmittance due to smoke generation occurs. The response signal generator 35 generates the response data on the basis of the discrimination signal from the discriminator 36. The response data is converted by the converter 31 to serial data which is then sent onto the transmission line l. The central monitor 1 performs an alarm/display operation when the response data is abnormality data.

In order to perform a function test, a test command is output from the central monitor 1. The command discriminator 34 outputs a test control signal and a response command signal. The test control signal is supplied to the amplifier 37 to change the gain, thereby operating the discriminator 36 in the test mode. When the intensity of light from the light-emitting unit 2 is decreased in the test mode, the gain of the amplifier 37 need not be decreased for the test. Furthermore, the number of commands can be increased to check if each of the light-emitting and light-receiving units 2 and 3 is operating normally.

When the pulse beam from the light-emitting unit 2 is modulated, a demodulator must be arranged between the amplifier 37 and the discriminator 36. When the abnormal state (smoke) is not detected by the light-receiving unit 3, but by the central monitor 1, the discriminator 36 need not be used. In this case, the output from the amplifier 37 can be input to the response signal generator 35 through an A/D converter or the like, and analog data representing the transmittance can be sent back to the central monitor 1. The central monitor 1 can then determine the abnormal state according to the data from the response signal generator 35.

The separation type detector of the present invention is not limited to an extinction smoke sensor, but can also be applied to other separation detectors which have separate transmission and reception units which must be synchronized with each other, and which can be exemplified by a burglar alarm system for causing a remote transmission unit to emit ultrasonic waves to its corresponding remote reception unit, detecting intruders or objects in accordance with changes in the ultrasonic waves.

As is apparent from the above description, since the transmission circuits of the transmission (light-emitting) and reception (light-receiving) units are assigned with the same address, they can be synchronized. In addition, the transmission unit is operated only when it is accessed by the central monitor, thus saving power. Since each pair of transmission and reception units has an address different from other pairs, no interference occurs between pairs.

Although various minor changes and modifications might be proposed by those skilled in the art, it will be understood that I wish to include within the claims of the patent warranted hereon all such changes and modifications as reasonably come within my contribution to the art.

I claim as my invention:

1. A separation type atmospheric detector system, comprising:

a central monitor connecting to a transmission line;

detection means connected to the transmission line for detecting an atmospheric abnormality according to changes in at least one pulse transmitted from a transmission unit to a reception unit of the detection means, said detection means sending an abnormality signal to the central monitor through said transmission line;

the transmission unit and reception unit of the detection means comprising an associated pair in proximity to one another and each of the transmission and reception units having means for assigning a same given address to each unit of the pair; and said transmission unit and reception unit each having means for being synchronously operated with respect to one another in response to a command from said central monitor.

2. A detector according to claim 1 wherein said transmission unit has means for transmitting a light pulse beam and said reception unit has means for receiving said light pulse beam.

3. A detector according to claim 1 wherein said transmission unit includes a signal converter means with a serial/parallel circuit means for converting a serial access signal from said central monitor to a parallel signal, and for outputting an address signal and a command signal; a preset address generator means for generating the given address assigned to said transmission unit; an address comparator means for receiving the address signal from said signal converter means and the given address from said preset address generator means and outputting a coincidence signal when the address signal coincides with the given address; and a command identification circuit means for identifying a command given presence of the coincidence signal.

4. A detector according to claim 3 wherein said transmission unit further includes a light emitting means, a monostable multivibrator means connected to receive the coincidence signal and provide an output in response thereto, and a drive means for driving said light-emitting means in response to said output signal from said monostable multivibrator means.

5. A detector according to claim 3 wherein said reception unit includes a signal converter means having a serial/parallel circuit means for converting a serial access signal from said central monitor to a parallel signal, and for outputting an address signal and a command signal; a preset address generator means for generating the given address assigned to said transmission and reception unit pair; an address comparator means for receiving the address signal from said signal converter means and the given address from said preset address generator means and outputting a coincidence signal when the address signal coincides with the given address; a command identification circuit means for identifying the command upon occurrence of the coincidence signal; and a response signal generator means for sending back a response signal to said signal converter means.

6. A detector according to claim 5 wherein said reception unit further includes a light-receiving means for receiving the pulse beam from a light-emitting means from the transmission unit, amplifier means for amplifying an output from said light-receiving means, and a discriminator means for receiving outputs from said command identification circuit means and said amplifier means, and for supplying a discrimination signal to said response signal generator means.

7. A detector according to claim 1 wherein the transmission unit has means for providing a pulse beam which is a modulated pulse beam.

8. A detector according to claim 7 further including a demodulator means connected between an amplifier means and a discriminator means in said reception unit.

9. A detector according to claim 1 wherein said detecting means transmission unit emits pulses which are ultrasonic waves.

10. A separation type atmospheric detector system, comprising:

a transmission line connecting to a central monitor;

a plurality of detection means, each of which is formed of an associated transmission unit and reception unit pair, and each of which is connected to the transmission line;

said detecting means detecting atmospheric abnormality according to changes in pulses transmitted from said transmission unit to said reception unit through atmosphere being checked;

said detecting means being adapted to send an abnormality signal to said central monitor through said transmission line as a result of a detected atmospheric abnormality;

said transmission unit and said reception unit each having preset address generator means which generate a same given address for the reception unit and the transmission unit of the pair; and address comparator means associated with each transmission and reception unit of the pair for generating a coincidence signal for operating the transmission unit to send said pulse and operating the reception unit to receive said pulse synchronously with one another in dependence upon the transmission and reception units each receiving said given address over said transmission line from said central monitor.

11. The system according to claim 10 wherein the transmission unit contains means for transmitting a pulse which is one of the pulses light or sound and which has a predetermined pulse length, and wherein said associated reception unit has means for detecting a length of the received pulse as a measure of atmospheric abnormality.

12. The system according to claim 10 wherein both the transmission unit and the reception unit each have a command identification means for identifying a command received from the central monitor via the transmission line such that the transmission unit and reception unit of a given pair identify the same command and thus operate compatibly and synchronously with one another relative to carrying out the command.

13. The system according to claim 12 wherein the command identification means identify either a response data request command or a test command, said command identification means for said test command changing operating parameters suitable for testing the transmission unit and reception unit.

* * * * *